UNITED STATES PATENT OFFICE.

ANSON GARDNER BETTS, OF TROY, NEW YORK.

TREATING SLIMES FROM ELECTROLYTIC REFINING OF LEAD.

No. 891,395.     Specification of Letters Patent.     Patented June 23, 1908.

Application filed December 8, 1906. Serial No. 346,894.

*To all whom it may concern:*

Be it known that I, ANSON GARDNER BETTS, a citizen of the United States, residing at Troy, in the county of Rensselaer and State of New York, have invented certain new and useful Improvements in Treating Slime from the Electrolytic Refining of Lead, of which the following is a specification.

This invention relates to the treatment of anode slime from the electrolytic refining of lead, by direct melting.

The object of the invention is to provide a quick and cheap method.

To carry out my process I oxidize the slime preferably by air which may be done in a preliminary step either slowly at the ordinary temperature, or more quickly by heating to say 200 to 300 degrees centigrade.

On melting the oxidized or oxidizing slime in a crucible or other suitable furnace, not all the silver will usually be found as metal at the bottom of the melt as antimony peroxids are apt to be present, and these carry the silver into the slag. I accordingly prefer to add a reducing agent during or before the melting to reduce antimony tetroxid and antimony pentoxid to the readily fusible trioxid, which does not oxidize the silver, raw slime being especially suitable as reducing agent.

In such ways as the above I am able to produce a slag carrying most of the lead and antimony and a doré bullion containing the silver.

When bismuth is present in the slime, the process works especially well, and the operation is less delicate, for in case a little excess of oxygen is present, the result is to drive more of the bismuth into the slag, and in case a little less oxygen is present more bismuth will go into the metal, while the lead and antimony are in either case found almost entirely in the slag and the silver and gold in the metal. The presence of bismuth in the metal is desirable also, because it lowers the melting point of the alloy, and permits carrying out the operation at a lower temperature, with less volatilization. When sulfur is present in the slime, or is purposely added, a matte, high in copper, is also produced.

Analyses of such products from a single melting are—

| Metal. | | Matte. | Slag. |
|---|---|---|---|
| Gold | .78% | | |
| Silver | 65.75% | 30 % | |
| Bismuth | 20.3 % | | 2.95% |
| Copper | 5.1 % | 46.3% | 1.15% |
| Antimony | 1.3 % | None | 28 % |
| Lead | .8 % | | 34.9 % |

In making the above melt it was not necessary to add a reducing agent, as the slime happened to be oxidized to just the right extent, by the preliminary heating in air that it received. The slag may then be cleaned from some of the bismuth and any gold and silver it may contain, by treating it in the melted condition with a little reducing agent, especially well with a metal as lead or antimony, or a mixture of metals as slime, which precipitates out bismuth, and this carries with it the silver and gold.

After cooling I treat the slime with an acid or mixture of acids to dissolve one of the principal metals lead and antimony present and leave the other, especially preferring the use of hydrofluoric and sulfuric acids to dissolve the antimony as fluorid and convert the lead to lead sulfate.

Part of the copper and perhaps traces of silver will dissolve with the hydrofluoric acid treatment, but this can be precipitated out by means of metallic antimony, before electrolyzing the solution for metallic antimony.

I prefer not to use an excess of hydrofluoric acid in treating the slime in order to dissolve as little silica as possible.

The residue left after the extraction of the lead or antimony can be treated by well-known methods for the remaining values.

What I claim as new and desire to secure by Letters Patent is:—

1. The process of treating anode slime from the electrolytic refining of lead, which consists in oxidizing the slime and melting it with a reducing agent to reduce antimony peroxids to trioxid, producing a slag carrying most of the lead and antimony and a doré bullion.

2. The process of treating anode slime from the electrolytic refining of lead which consists in oxidizing the slime and melting it with the addition of unoxidized or comparatively little oxidized slime as reducing agent, producing a slag carrying most of the lead and antimony and a doré bullion.

3. The process of treating anode slime from the electrolytic refining of lead which consists in oxidizing the slime and melting it with the addition of material containing metallic antimony as reducing agent, producing a slag carrying most of the antimony and lead and an alloy containing the silver and gold.

4. The process of treating anode slime from the electrolytic refining of lead which consists in oxidizing and melting it to a doré bullion, and a slag containing most of the antimony and lead, and treating the slag with an acid or mixture of acids capable of dissolving one only of the two principal metals thereof.

5. The process of treating anode slime from the electrolytic refining of lead which consists in oxidizing and melting it to a slag containing most of the lead and antimony and an alloy containing the silver and gold, and treating the slag with hydrofluoric acid to remove antimony therefrom.

In testimony whereof I have signed my name to this specification in the presence of two subscribing witnesses.

ANSON GARDNER BETTS.

Witnesses:
 RALPH H. SHERRY,
 BEN. STARBUCK.